(12) United States Patent
Hawkins et al.

(10) Patent No.: US 9,147,034 B1
(45) Date of Patent: Sep. 29, 2015

(54) CIRCUIT LAYOUT VERIFICATION METHOD

(71) Applicants: Keysight Technologies, Inc., Minneapolis, MN (US); Agilent Technologies, Inc., Loveland, CO (US)

(72) Inventors: Anne Marie Hawkins, Santa Rosa, CA (US); Praveen Vs, Bangalore (IN)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 14/319,513

(22) Filed: Jun. 30, 2014

(51) Int. Cl.
*G06F 17/50* (2006.01)

(52) U.S. Cl.
CPC .................. *G06F 17/5081* (2013.01)

(58) Field of Classification Search
CPC ................. G06F 17/30; G06F 17/50
USPC .................. 716/102; 257/E27.105
See application file for complete search history.

(56) References Cited

U.S. PATENT DOCUMENTS

| | | | | |
|---|---|---|---|---|
| 2002/0108095 A1* | 8/2002 | Barney et al. | | 716/10 |
| 2006/0107240 A1* | 5/2006 | Pikus et al. | | 716/2 |
| 2006/0200789 A1* | 9/2006 | Rittman | | 716/19 |
| 2007/0157140 A1* | 7/2007 | Holesovsky et al. | | 716/5 |
| 2008/0288907 A1* | 11/2008 | Laing | | 716/14 |

\* cited by examiner

*Primary Examiner* — Mohammed Alam (57) ABSTRACT

A method for operating a data processing system to generate a layout for a netlist circuit based on a physical layout of that circuit is disclosed. A schematic of the circuit and an input defining a physical layout of the circuit are received by the data processing system. The schematic includes a plurality of schematic devices, characterized by unique schematic device names. The data processing system generates a graphical representation of the circuit from the physical layout, having one layout device corresponding to each of the plurality of schematic devices, each layout device being characterized by a graphical representation name that is the same as the schematic device name of the corresponding schematic device. First and second netlists are generated from the graphical representation and schematic, respectively. The data processing system generates a report specifying any differences in the first and second netlists.

20 Claims, 4 Drawing Sheets

CIRCUIT LAYOUT VERIFICATION METHOD

BACKGROUND

The fabrication of a modern integrated circuit having millions of devices therein is a complex and expensive process. Hence, the design of the integrated circuit and corresponding fabrication details are subjected to numerous tests prior to actually fabricating a device to prevent errors that waste valuable time and money. The fabrication process typically starts with a schematic that represents the circuit from an electrical point of view. That schematic representation is typically input to computer-based simulators that verify that the circuit should work as intended.

For the purpose of fabrication, the various devices and connecting wires in the schematic are laid out on the surface of an integrated circuit substrate. A large scale integrated circuit is represented by geometrical structures (usually polygons) on a series of masks that are used in the fabrication process. The collection of such structures that represents the integrated circuit will be referred to as the geometrical representation of the integrated circuit in the following discussion. The circuit designer typically uses a set of computer aided design (CAD) tools to generate the geometrical representation from the schematic and information about the physical placement of the devices on the integrated circuit substrate. Since there are millions of polygons in the graphical representation, there is a significant probability that the graphical representation has errors. That is, the device and interconnect defined by the graphical representation are electrically different than the device and interconnect defined by the circuit schematic. Accordingly, a design check in which the graphical representation is compared to the schematic representation is utilized.

One such design check is referred to as a layout versus schematic (LVS) check. In this design check, the graphical representation of the circuit is used to generate a netlist for the underlying circuit. A netlist is also generated from the circuit schematic. If the two netlists do not agree, then there is an error in the graphical representation of the circuit. For the purposes of the present discussion, a netlist is a listing of the various "nets" in the integrated circuit. A net consists of all conductive elements that are electrically connected to each other to form a single continuous conductor and the pins of the devices that are connected to that net.

The generation of a netlist from the graphical representation of the circuit requires that the generating program be able to identify the devices and interconnects based on the shapes and relationships of those shapes as the shapes are described in the graphical representation of the circuit. Typically, the netlist generation is divided into two parts. First, a device recognition engine extracts a list of devices, the conducting graphical structures included in those devices that represent the device pins, and conducting graphical structures that represent interconnects from the graphical representation. Next, a netlist comparison engine compares the nets generated from the schematic with the conducting structures and devices from the graphical representation to determine if each net in the schematic is found in the output of the device recognition engine.

The device recognition task is formidable. For example, the device recognition software must be able to determine that two polygons that overlay each other on different metal layers in the integrated circuit are plates of a capacitor as opposed to two metal conductors or a via. The information needed to make such determinations is typically contained in a set of "rules" that are input to the device recognition software. The rules are dependent on the particular fabrication facility. The number of rules in a typical rule set is typically in the thousands. The time and cost needed to create a set of rules for each fabrication process is a substantial barrier to lowering the cost of fabrication of integrated circuits. Hence, it would be advantageous to provide a device recognition engine that does not rely on a large complex rule set that can be used in the LVS verification systems.

The device recognition engine also computes various electrical parameters of the devices that it detects. These values are stored as part of each device instance. The parameter calculations must be specified in the rule set. The task of extracting parameter values is one of the most difficult aspects of writing device recognition rules.

There are analogous verification problems in the design and fabrication of complex systems that are constructed from a number of integrated circuits that are connected together by wire bonds or connected on circuit boards having multiple layers of wiring. Prior to the actual fabrication of the devices, the designer must be able to verify that the layout of the system is consistent with the schematic representation of the system. Unfortunately, there is no equivalent LVS checking system for such devices based on physical connectivity.

SUMMARY

The present invention includes a method for operating a data processing system to detect layout errors in a circuit. The method includes receiving a schematic of the circuit and an input defining a physical layout of the circuit. The schematic includes a plurality of schematic devices, each schematic device being characterized by a unique schematic device name. The data processing system generates a graphical representation of the circuit from the physical layout, the graphical representation having one layout device corresponding to each of the plurality of schematic devices, each layout device is characterized by a unique layout device name that is the same as the schematic device name of the corresponding schematic device. In addition, each layout device can be characterized by a layout device type that must match a corresponding schematic device type for the schematic device that matches that layout device. The graphical representation also includes the conducting structures used to form the layout devices and interconnects between the layout devices. First and second netlists are generated from the graphical representation and schematic, respectively. The data processing system generates a report specifying any differences in the first and second netlists.

In one aspect of the invention, each of the schematic devices is further characterized by a plurality of unique schematic pin names, and each of the layout devices is characterized by a plurality of graphical representation pin names. The method further includes comparing the schematic pin names to the graphical representation pin names when generating the first netlist.

In another aspect of the invention, each of the schematic devices is further characterized by a schematic device electrical property, and each of the layout devices is characterized by a layout device electrical property. The method further includes comparing the layout device electrical property with the schematic device electrical property of one of the schematic devices.

In a still further aspect of the invention, the schematic further includes an extra schematic device that does not have a corresponding layout device, and the method further includes causing the data processing system to remove that schematic device from the schematic before generating the second netlist. The extra schematic device can be specified by user input to the data processing system and/or a device type associated with the extra schematic device.

In yet another aspect of the invention, one of the schematic devices is characterized by a plurality of schematic device properties, and the data processing system removes one of the plurality of schematic device properties prior to comparing the schematic device with the layout device.

In another aspect of the invention, the data processing system removes one of the conducting structures that forms one of the layout devices before generating the first netlist. In one embodiment, that layout device has an internal conductive path between first and second pin structures in that layout device, and removing that conducting structure interrupts the conductive path. In one embodiment, the conducting structure that is removed is a via connecting conducting structures on two different metal layers in the circuit.

In another aspect of the invention, the conducting structure that is removed is determined by a device type associated with that one of the layout devices. The conducting structure that is removed can be determined by user input specifying the device type.

DETAILED DESCRIPTION

Figure 1A:
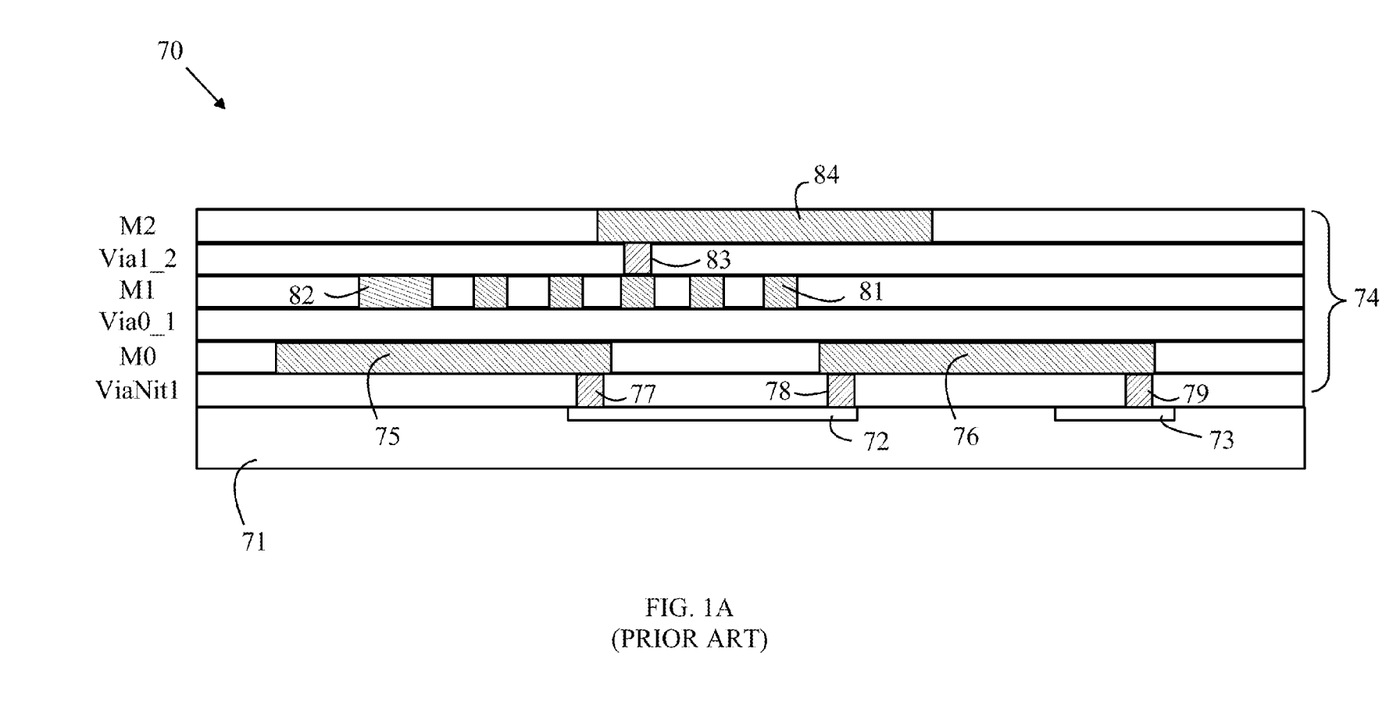
FIG. 1A is a cross-sectional view of a portion of an integrated circuit.

The manner in which the present invention provides its advantages can be more easily understood with reference to FIG. 1A, which is a cross-sectional view of a portion of an integrated circuit 70. Integrated circuit 70 includes a substrate 71 in which a number of devices such as devices 72 and 73 are constructed. Integrated circuit 70 also includes a plurality of conductive layers 74 in which various conducting structures are formed by etching the layer to provide various conductive structures. The conductive layers are typically divided into two classes, metal layers and via layers. The via layers are typically used to provide conduction paths between the structures in the metal layers. Integrated circuit 70 includes three via layers, ViaNit1, Via0_1, and Via1_2. The structures in the metal layers provide the "wires" that connect the various devices in integrated circuit 70. For example conductors 75 and 76 provide connections to devices 72 and 73 through vias 77-79.

It should also be noted that devices that are part of integrated circuit 70 can be constructed within the metal layers. For example, an inductor consisting of a spiral metal trace on layer M1 is shown at 81. Connections to this inductor are made via a conductor 82 that contacts the outer portion of the spiral and a conductor 84 that contacts the inner portion of the spiral through via 83. The conductors 82 and 84 are the pins associated with the inductor. The connections to these pins via conductors in the various metal layers are not shown in the cross-section of FIG. 1A.

As noted above, an integrated circuit can be viewed as consisting of a plurality of devices that are connected by conductors. Each device has a plurality of "pins" that form the connection points for the conductors. In general, the pins have unique labels. A conductor that connects a plurality of pins together is referred to as a net. The nets likewise have unique labels. The circuit can be characterized by a netlist which is a list that specifies each of the nets and the pins of the devices connected to that net (i.e., conductor). The circuit can be described in an electrical schematic which is used by simulators to test the circuit to ensure that the circuit functions as desired. Software for generating netlists from schematic representations of circuits is commercially available. The circuit can also be described in terms of the geometric shapes on the various mask layers used in the fabrication of the circuit.

Figure 1B:
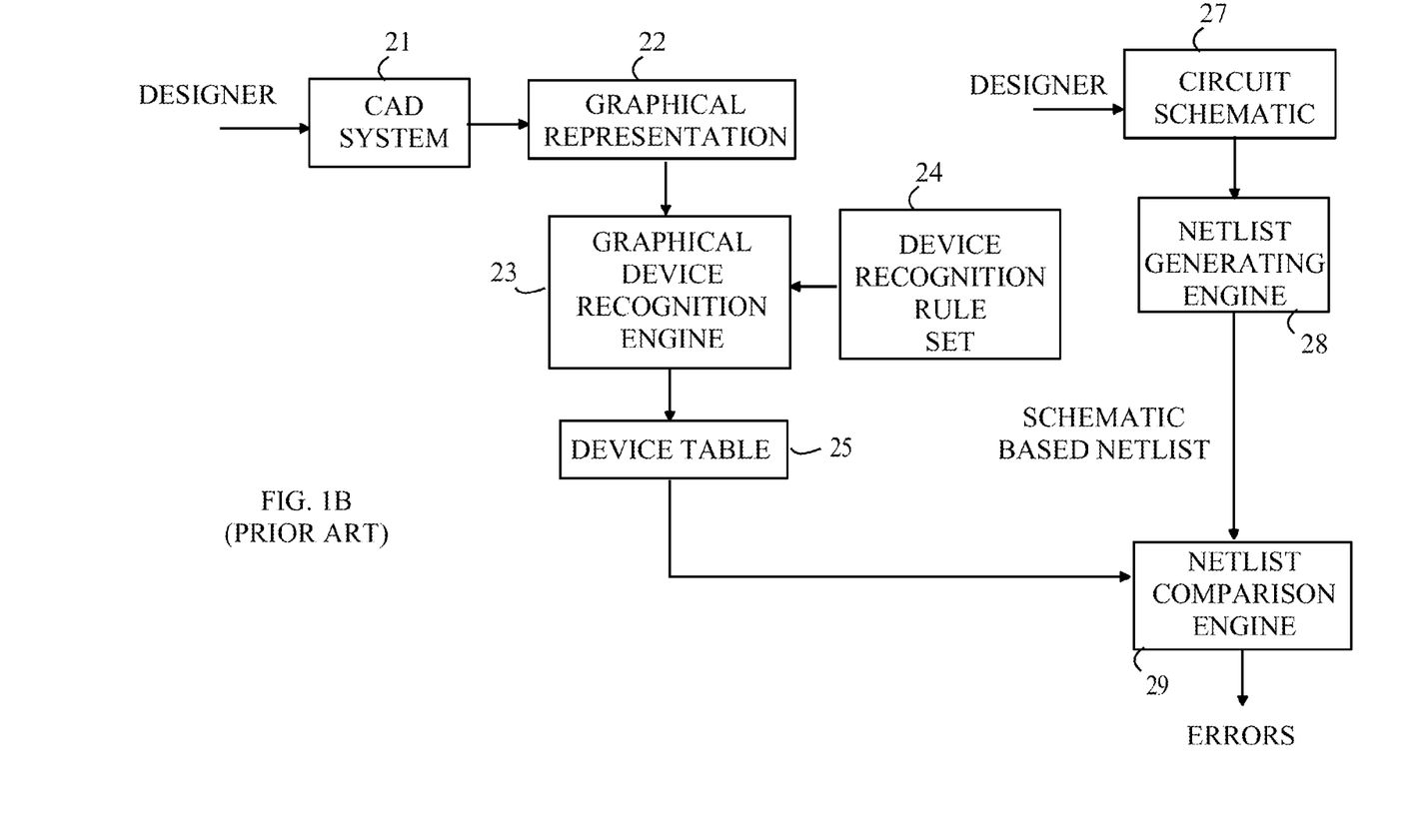
FIG. 1B illustrates the design flow and error checking used in designing a circuit for fabrication in a typical integrated circuit fabrication facility.

Refer now to FIG. 1B, which illustrates the design flow and error checking used in designing a circuit for fabrication in a typical integrated circuit fabrication facility. As noted above, the integrated circuit is constructed in a fabrication facility from a set of masks that are used in various deposition and etching processes. The designer typically lays out the circuit on the integrated circuit substrate using a CAD system 21. The CAD system typically has predefined components, referred to as p-cells, that can be used in the particular fabrication facility. When a p-cell is chosen, the designer specifies the values for the variable part of the p-cell such as the capacitance of a capacitor and the location of the component on the substrate. The CAD system then generates the artwork for the various layers which includes the shapes of the polygons on the various integrated circuit layers. The CAD system also allows the user to generate custom artwork for specific components and interconnects for connecting the components together.

The completed design from the CAD system includes a graphical representation of the integrated circuit which is a listing of all of the polygons on each layer as shown at 22. This graphical representation includes all of the polygons on the various conducting layers in the integrated circuit such as the metal and via layers discussed above. The graphical representation is input to a graphical device recognition engine 23 which extracts the identity of the various devices in the integrated circuit and the pins and polygons associated with those devices. Graphical device recognition engine 23 also outputs a list of all of the other polygons that form interconnects for the various devices. This information is output in a device table 25 that forms the input to a netlist comparison engine 29 which attempts to match the netlist generated from the schematic to nets in device table 25.

Netlist comparison engine 29 includes a physical conductivity engine that constructs nets from the polygons that are not part of the devices. The physical conductivity engine finds conductive polygons that contact one another to generate a net.

The designer also inputs a circuit schematic 27 of the integrated circuit which is used by circuit simulators and the like to simulate the integrated circuit. Circuit schematic 27 is used by a netlist generating engine 28 to generate a netlist from the devices and interconnects shown in circuit schematic 27. If the layout generated using CAD system 21 is an accurate representation of circuit schematic 27, there will be a net in device table 25 corresponding to each net in the netlist generated by netlist generating engine 28. If a match is not found for each net, an error is generated.

In this procedure, graphical device recognition engine 23 must be able to deduce which shapes in graphical representation 22 correspond to which types of devices in the integrated circuit. The device type, its pins, and the corresponding polygons that are associated with that device on each layer of the integrated circuit must be deduced without the aid of any of the other information that was input to CAD system 21. In the prior art, this task is accomplished by using a device recognition rule set 24. The rules test the relationships between various shapes on specified layers to deduce if the shapes belong to a known device. The collection of shapes that belong to a known device are then tested further to deduce the pins associated with that device. As noted above, generating a rule set that provides this functionality is a very expensive process and must be repeated for different fabrication facilities and changes within those fabrication facilities' library of devices.

Device table 25 includes two types of entries. The first type corresponds to the devices that were found by graphical device recognition engine 23. Each of these devices includes a corresponding list of polygons on conductive layers that are part of that device and the pins that form the connections to the devices. The device information also includes device properties such as the resistance of a resistor. The device properties aid the netlist comparison engine in determining the correspondence between devices in the schematic representation of the circuit and devices in the physical representation of the circuit.

The second type of entry are polygons on conductive layers that are used for interconnection. It should be noted that for the purposes of checking the layout, only polygons that are on layers that are used for electrical conduction are included in device table 25. Polygons that define masks used for implants or other functions in the substrate of the integrated circuit are not included in device table 25.

The netlist comparison engine operates by selecting a net from the schematic and looking for the corresponding net in device table 25. Every functioning net has at least two terminals. The terminals are pins in both the schematic and device table 25 representations of the integrated circuit. If a pin in device table 25 corresponding to a known pin in the schematic can be identified, then all pins in device table 25 that are connected to that pin by conductors can also be determined. These pins describe a net in device table 25 that corresponds to the net in the schematic that includes the known pin in question. If the device table 25 net has one pin corresponding to each pin on the schematic net, the nets match.

Figure 2:
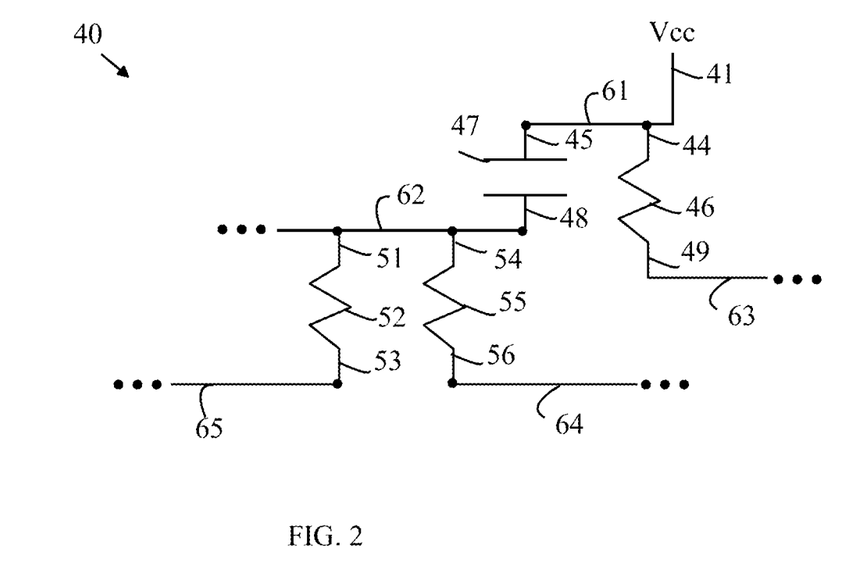
FIG. 2 is a schematic of a portion of a simple integrated circuit.

Refer now to FIG. 2, which is a schematic of a portion of a simple integrated circuit. The portion of integrated circuit 40 shown in the figure has five nets 61-65 and four devices. The netlist comparison engine starts the comparison from a special class of pins that represent the external connections to the integrated circuit. These pins will be referred to as external pins in the following discussion. The power rails are examples of the external pins. Pin 41 that is attached to Vcc is an example of such an external pin. Other examples of external pins are the signal connections to and from the integrated circuit. These pins are also noted in device table 25 as they are preserved by the CAD system engine that generates the list of polygons that is used as input to graphical device recognition engine 23. That is, there is some polygon in device table 25 that has a pin that is connected to Vcc. That polygon and all the other polygons that represent conductors and are attached to that polygon must correspond to net 61 if the layout in device table 25 is a valid representation of integrated circuit 40. The comparison process starts from one of the external pins.

All of the polygons that connect to the polygon connected to Vcc in device table 25 and form a continuous conductor must be the polygon structure corresponding to net 61. If this is true, then there should be two pins in device table 25, corresponding to pins 44 and 45, that are also connected to this polygon structure. If those pins are found, and no other pins attach to the polygon structure, then the polygons corresponding to net 61 have been successfully identified and nets match.

The process becomes more difficult when the nets for the external pins have been explored and matched, since there are no further "known" pins in both the schematic and device table 25. Hence, a new starting pin must be identified. As noted above, device table 25 also includes the device type for each device in device table 25. Hence, the device type corresponding to pin 45 is known, i.e., device 47 is a capacitor. If there is only one capacitor connected to net 61, then the pin that is not connected to net 61 and is a part of that capacitor, i.e., pin 48, provides a "known" pin that can be matched with a pin in the schematic netlist that allows a new net to be assembled and matched; in this case, that would be net 62 which is connected to pins 48, 51, and 54. Since the other device on net 61 which is connected by pin 44 is resistor 46, there is no ambiguity. That is, pin 49 could not be mistaken for pin 48.

Problems arise when there are multiple devices of the same type connected to a net in parallel. In this case, the device parameters provide a clue as to the correspondence between the device in the schematic and the devices in the physical representation of the circuit. When net 62 is explored, polygons corresponding to pins 51 and 54 are identified; however, since devices 52 and 55 are resistors, there is ambiguity as to the identity of the corresponding pins in the schematic. This is particularly problematic when the resistors are identical, since the device parameter, i.e., the resistance of the resistor is no longer useful in differentiating different devices. Unfortunately, the names associated with the devices in device table 25 are different from the device names in the schematic, since that information was not preserved when the graphical representation was generated. The graphical device recognition engine generates a name for each device that it discovers. The graphical device recognition engine also assigns a device type for the device and may determine certain properties of the device from the shape and sizes of the polygons in the device. For identical devices, there is insufficient information to unambiguously make the necessary assignments. Hence, the comparison must be attempted assuming both possibilities to see if either provides a consistent match to the schematic.

Prior art systems also suffer from problems that arise because of inconsistencies between the schematic representation of the circuit and layout representation. The schematic representation of the circuit is used to test the design using circuit simulators. As such, the schematic representation may include devices that model the behavior of the circuit at high frequencies. For example, the schematic may include transmission lines that model the parasitic behavior of various interconnects in the physical layout of the circuit. These devices will be referred to as simulation devices in the following discussion. In addition, the devices in the schematic may include parameters that are not relevant to testing the physical layout of the circuit. When the netlist comparison engine attempts to match devices in the schematic to devices extracted by graphical device recognition engine, these additional parameters are not matched, and hence, can generate errors.

To reconcile the two representations of the circuit, the designer is typically required to manually edit the schematic to remove the simulation devices and parameters that do not have a correspondence with parameters that are extracted by the graphical device recognition engine.

In the present invention, the CAD system receives both the schematic representation of the circuit and the layout representation of the circuit. The designer inputs both the schematic representation for simulation purposes and the layout representation. The designer can reference the schematic when inputting the layout of circuit. In one aspect of the invention, the CAD system also includes a circuit simulator that performs the simulation on the circuit. However, embodiments in which the circuit schematic is output as a separate file that can be input to an external circuit simulator can also be constructed. For the purposes of the present discussion, the CAD system needs only to have the schematic representation of the circuit available to the designer during the layout of the circuit.

One aspect of the present invention is based on the observation that the databases generated by the CAD system include the information needed to generate device table 25 without the need to generate the complex rule sets utilized in the prior art while preserving the names of the components such that a correspondence between names of devices in the schematic representation of the integrated circuit can be matched to the devices in the device table. The physical layout of a device is accomplished by selecting the device from either a predefined cell or custom artwork for that device. The CAD system generates the various physical components such as the polygons discussed above and the pins. During the layout of the device, the designer references the corresponding entity in the schematic drawing, and hence, the CAD system assigns the corresponding names for the device and pins of that device. Hence, at the end of the layout definition phase, the CAD system includes the artwork corresponding to each device with device names and pin names that match the names in the schematic. The CAD system also includes various polygons on the conductive layer that are defined as interconnects for the devices in the layout.

Figure 3:
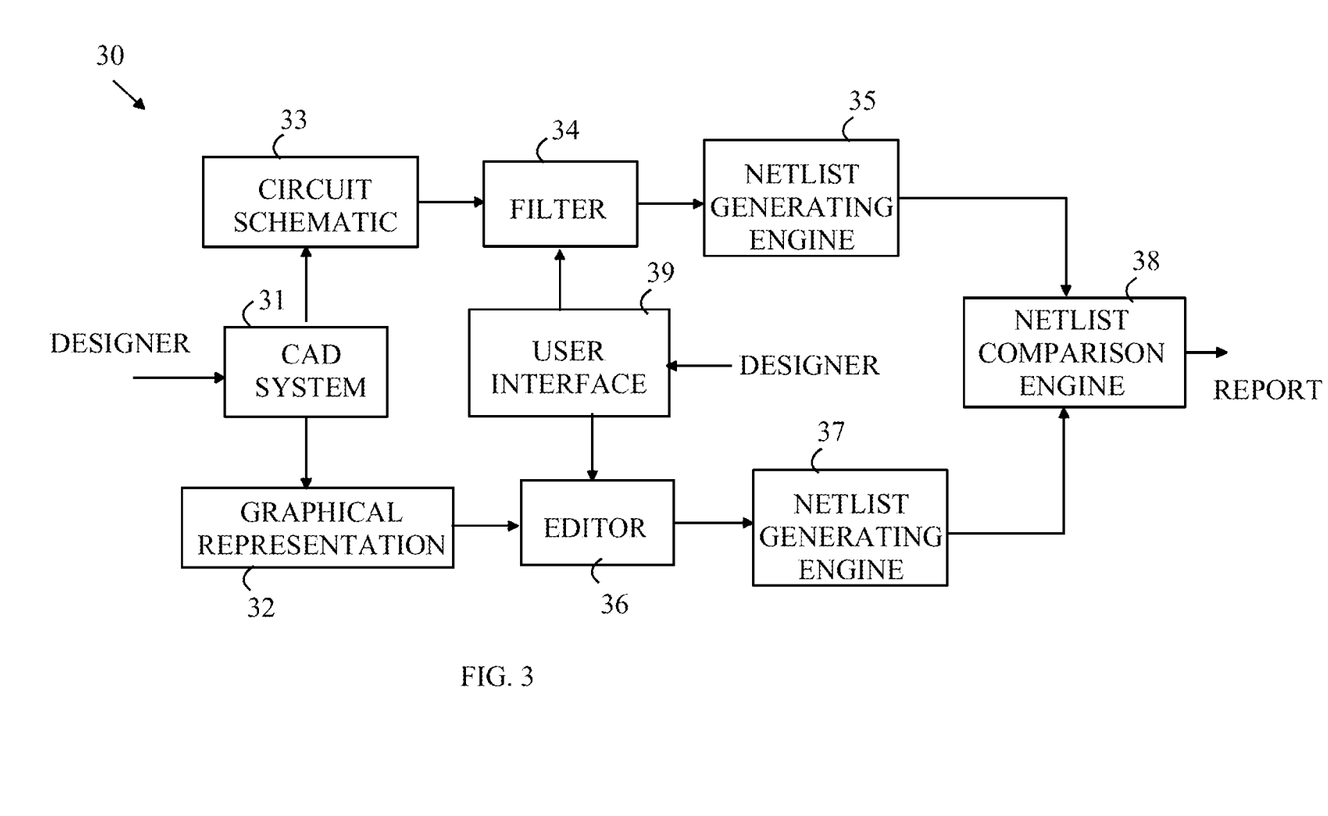
FIG. 3 illustrates a CAD system that provides LVS checking according to one embodiment of the present invention.

Refer now to FIG. 3, which illustrates a CAD system 30 that provides LVS checking according to one embodiment of the present invention. The designer enters the design in CAD system 31. The design includes information specifying a circuit schematic 33 and a graphical representation 32 of the circuit. The schematic can include additional devices that model the behavior of the circuit at high frequencies or other devices that are not implemented in the physical layout of the circuit.

When the designer inputs a command to CAD system 31 to place a device on the substrate or in the metal layers over the substrate, CAD system 31 generates the artwork for the conductive layers of the device in terms of a number of polygons and labels the device and component polygons including the polygons that constitute the pins of the device. In the case of a device that is specified by a p-cell, CAD system 31 sizes the various polygons according to rules in a macro and generates the polygons at the correct sizes and locations on each layer. In the case of non-p-cell devices and conductors, the user either specifies the device in terms of pre-drawn artwork from a library or draws the artwork directly on the layers in question and provides the names for the devices and conductors. CAD system 31 also computes the device parameters for each device such as the resistance of resistors and capacitance of capacitors included in the design. In the present invention, the graphical representation includes all of the information of the prior art systems that utilize a shape recognition engine that would be included in the device table generated by such systems; however, the information is generated without the need to utilize a complex rule set to recover information that was eliminated when the prior art system generated a graphical representation solely from the artwork for the circuit. In addition, the names of the devices, and the pins in the graphical representation match the names of the devices and pins in the circuit schematic.

In many cases, however, the circuit schematic and graphical representations of the circuit have important differences that must be harmonized before an LVS check can be performed. These differences arise from two sources. First, as noted above, the circuit schematic can include a number of devices that are not actually implemented in the physical layout, such extra schematic devices can include devices that emulate the parasitic behavior of conductors or devices in the layout at high frequencies. Similarly, the graphical representation can have extra layout devices that are not related to the devices in the schematic such as polygons that represent borders, text, or logos.

Before an LVS test can be performed, any extra layout devices or extra schematic devices must be removed from the circuit schematic and/or the graphical representation. In one aspect of the present invention, a filter 34 is applied to the circuit schematic to automatically remove certain devices, based on the device type. The specific device types can be input by the designer through a user interface 39. In addition, the designer can eliminate specific devices via user interface 39. When a device is eliminated, the breaks in the circuit are sealed with a conductor.

Similarly, editor 36 filters out the devices in the graphical representation that have no corresponding schematic device. Two classes of these devices exist. The first class includes devices that have no pins. The borders, text, and logo type devices are in this class. Devices of this class can be automatically removed. The second class of devices requires device specific editing. If a device only appears in one representation of the circuit it can be removed in many cases. If the removal introduces an open circuit into the device, the conductors can be "healed" by connecting the break points with conductors.

Removing a device is appropriate when the device is present only in one of the circuit representations. However, in some cases, a device exists in both the schematic and the graphical representation; however, the device is "wired" differently in the two circuit representations. One solution to this problem is to remove the device from both representations and alter the connectivity to heal the breaks introduced by the removal. For example, the pins that are no longer connected through the removed device can be shorted by a conductor to provide connectivity between the conductors that were broken by removing the device. However, more information can be preserved if specific pins are either shorted or disconnected in one or both of the representations. The specific alterations will depend on the specific device.

In some cases, the alterations can be accomplished by changing the device type in one of the representations. For example, there can be multiple schematic devices that share a common layout description. One schematic device may be used in the schematic because it provides a more accurate simulation model. However, from a manufacturing perspective, the multiple schematic devices appear the same. Hence, the problem schematic device is replaced by the schematic element that most nearly matches the device in the graphical representation.

In some cases, a device in the graphical representation of the circuit can correspond to a plurality of devices in the schematic. This situation can arise when the device in the graphical representation is replaced by a set of components that are wired together and which are used in the simulator to test various aspects of the device. In this case, the plurality of devices in the schematic are replaced by a single device having the same number of pins and name as the device in the graphical representation.

In one aspect of the invention, the "device" as defined in the graphical representation is the device whose name and properties are used to define the device that must be found in the schematic. This aspect of the invention simplifies the definition of a device in a manner that enables resolving this type of discrepancy between the schematic and graphical representations of the circuit.

After the schematic and graphical representations have been filtered or edited, there should be a one-to-one correspondence between the devices and pins in the filtered schematic and the devices and pins in the graphical representation of the circuit. In one aspect of the invention, the CAD system checks for this correspondence and issues an error report if the correspondence is not found.

The second source of inconsistencies between the graphical representation of the circuit and the schematic representation arises in devices in which two pins are connected by a conductor. Consider the case of a spiral inductor that is constructed in the metal layers of the integrated circuit. The inductor consists of a spiral trace in one of the metal layers. One end of the trace is connected to a pin in one metal layer, and the other end of the trace is connected to a pin in another metal layer. The end of the trace in the middle of the spiral must be connected to the corresponding pin, P1, through a via that makes the transition between the metal layers. The other pin, P2, that connects to the outside of the spiral can be on another metal layer and be connected to the spiral by another via or be on the same layer as the spiral conductor. In the schematic representation of the integrated circuit, P1 and P2 are on different nets.

From the point of view of physical conductivity, P1 and P2 are shorted together by a conductor, namely the spiral trace. Hence, a netlist generated from the graphical representation of the circuit will place P1 and P2 on the same net. In the schematic representation of an inductor, the pins are on separate nets, since the inductor is viewed as a circuit element that does not short the two pins together. A similar problem is encountered in other devices that allow a current to flow between two pins.

In principle, this inconsistency can be eliminated either by modifying the schematic to artificially short the two pins on the schematic, and hence, bring the schematic into agreement with the physical conductivity view of the circuit or by modifying the graphical representation of the circuit to break the conductive path between the two pins, and hence, bring the graphical representation into agreement with the schematic representation of the circuit.

If the first alternative is used, possible shorts to the spiral conductor within the physical layout could be missed. Hence, the second alternative is preferred. In one aspect of the present invention, an editor 36 removes one or more conductors from specific devices to prevent the physical netlist generating engine from viewing the pins of the device as being shorted together. The physical representation is preferably altered by removing one of the polygons from the device and thereby breaking the connection between the pins. The specific polygon that is removed depends on the particular device type. The spiral inductor discussed above includes at least one via that connects the inner end of the spiral to a metal layer on another metal layer. The via connection is specified by a polygon on a layer between the metal layers in question. In one aspect of the invention, editor 36 removes this polygon from the polygons that describe the inductor, thereby preventing the physical netlist generating engine from mistakenly assigning both of the pins to the same net by following a conducting path through the device.

The removal of a polygon specifying a via connection is preferred because such polygons are unlikely to be the source of an unintentional connection to another conductor that would alter the netlist. One of the goals of the LVS is the detection of such unintentional shorts. Hence, this alteration is unlikely to alter the LVS analysis.

The specific alterations applied to the graphical representation can be altered by the designer through user interface 39 by specifying particular polygons to remove from the graphical representation of the circuit. A list of edits can also be provided by the CAD system for specific devices that are known to cause problems. Hence, the number of commands that the designer needs to enter are relatively small. In addition, the number of default edits provided by the CAD system is far smaller than the number of rules in the rule sets of the prior art.

Referring again to FIG. 3, once the circuit schematic and graphical representations of the circuit have been harmonized, a schematic netlist generating engine 35 generates a schematic-based netlist and a physical netlist generating engine 37 generates a corresponding layout-based netlist. The two netlists are then compared by netlist comparison engine 38 which generates an LVS report detailing discrepancies between the two netlists.

The above-described embodiments are directed to LVS checking for integrated circuits. However, there are analogous problems in systems constructed from packaged components that are mounted on printed circuit boards. In such systems, the packaged components have pins that are connected to conducting structures in a multi-layered printed circuit board structure that is analogous to the metal layers described above. The printed circuit board has layers in which conductors are formed by etching the corresponding metal layer. Connections between structures in various metal layers are made through metal filled via connections that are analogous to the vias described above. The various devices are mounted on the top surface of the printed circuit board and the connections are made to pins on the device. Surface mount devices typically have pads on the underside of the device that make contact with corresponding pads on the surface of the printed circuit board. The surface pads are then connected to conductors in the various conducting layers by vias.

The printed circuit board systems, and modules that are constructed from individual components connected by bond wires or the like, are laid out using CAD systems that are analogous to the CAD systems used to layout integrated circuits. The developer specifies the wiring layers which are in turn translated into conducting structures on the various layers and vias connecting those structures. The output of the CAD system includes the conductor shapes on the various layers and the device pins to which these shapes connect.

As the printed circuit board systems become more complex, there is a need for an LVS check analogous to that described above for integrated circuits. That is, the system is described by a schematic drawing that is used by a circuit simulator to test the system to ensure that the overall circuit of the system operates as desired. That simulator can provide a netlist for the system. However, there is no system that performs the functions analogous to the physical conductivity netlist and schematic netlist comparison described above.

The CAD system of the present invention can provide such an LVS for these types of printed circuit boards or similar circuits. The alterations required to perform this type of analysis on different forms of circuits consist of changing the libraries that specify the artwork for the printed circuit board fabrication systems. In such systems, the devices are discrete devices with pins. In addition, the designer specifies interconnects using conducting shapes in the various metal layers of the printed circuit board. The conducting interconnections can also be specified by separate conductors formed from bond wires or the like. Formally, the bond wires can be viewed as being implemented in one or more additional metal layers.

The method of the present invention can be practiced on a general purpose data processing system or on specialized hardware such as highly parallel processors.

The present invention also includes a computer readable medium that stores instructions that cause a data processing system to execute the method of the present invention. A computer readable medium is defined to be any medium that constitutes patentable subject matter under 35 U.S.C. 101 and excludes any medium that is not patentable under 35 U.S.C. 1.01. Examples of such media include non-transitory media such as computer memory devices that store information in a format that is readable by a computer or data processing system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a data processing system to detect layout errors, said method comprising:
    receiving a schematic of a circuit, said schematic comprising a plurality of schematic devices, each schematic device being characterized by a unique schematic device name;
    receiving user input defining a physical layout for said circuit, said physical layout comprising a plurality of layout devices, each layout device being characterized by a unique layout device name;
    causing said data processing system to generate a graphical representation of said circuit from said physical layout, said graphical representation having one layout device corresponding to each of said plurality of schematic devices, said schematic device name for each schematic device matching said layout device name of a corresponding one of said layout devices;
    causing said data processing system to generate a first netlist from said graphical representation of said circuit;
    causing said data processing system to generate a second netlist generated from said schematic; and
    causing said data processing system to generate a report specifying any differences in said first netlist and second netlist, wherein each schematic device name matches said corresponding one of said layout device names prior to said data processing system generating said first and second netlists.

2. The method of claim 1 wherein each of said plurality of schematic devices is further characterized by a plurality of unique schematic pin names, and wherein each of said layout devices is characterized by a plurality of graphical representation pin names, said method further comprising comparing said plurality of unique schematic pin names to said plurality of graphical representation pin names when generating said first netlist.

3. The method of claim 1 wherein each of said schematic devices is further characterized by a schematic device electrical property, and wherein each of said layout devices is characterized by a layout device electrical property, said method further comprising comparing said layout device electrical property with said schematic device electrical property of one of said schematic devices.

4. The method of claim 1 wherein said schematic further comprises an extra schematic device that does not have a corresponding layout device and wherein said method further comprises causing said data processing system to remove that schematic device from said schematic before generating said second netlist.

5. The method of claim 1 wherein said graphical representation further comprises an extra layout device that does not have a corresponding layout device and wherein said method further comprises causing said data processing system to remove that layout device from said schematic before generating said second netlist.

6. The method of claim 4 further comprising causing said data processing system to receive user input specifying said extra schematic device.

7. The method of claim 5 further comprising causing said data processing system to receive user input specifying said extra layout device.

8. The method of claim 4 wherein said schematic devices are characterized by a schematic device type and wherein said extra schematic device is removed based on said schematic device type.

9. The method of claim 5 wherein said layout devices are characterized by a layout device type and wherein said extra layout device is removed based on said layout device type.

10. The method of claim 3 wherein one of said schematic devices is characterized by a plurality of schematic device properties and wherein said data processing system removes one of said plurality of schematic device properties prior to comparing the schematic device electrical property with said layout device electrical property.

11. The method of claim 1 wherein one of said layout devices comprises a plurality of conducting structures and wherein said data processing system removes one of said plurality of conducting structures before generating said first netlist.

12. The method of claim 11 wherein said one of said layout devices has an internal conductive path between first and second pin structures in that one of said layout devices and wherein removing said one of said plurality of conducting structures interrupts said internal conductive path.

13. The method of claim 12 wherein said one of said layout devices comprises an inductor.

14. The method of claim 12 wherein said one of said layout devices comprises a resistor.

15. The method of claim 6 wherein said one of said conducting structures comprises a conducting via connecting conducting structures on two different metal layers in said circuit.

16. The method of claim 11 wherein said one of said conducting structures that is removed is determined by a device type associated with that one of said layout devices.

17. The method of claim 16 further comprising causing said data processing system to receive user input specifying said device type.

18. The method of claim 1 wherein said circuit comprises a plurality of devices connected to a printed circuit board having a plurality of metal layers in which conductors are fabricated.

19. A computer readable medium comprising instructions that cause a data processing system to execute a method for operating a data processing system, said method comprising receiving a schematic of said circuit, said schematic comprising a plurality of schematic devices, each schematic device being characterized by a unique schematic device name;

receiving user input defining a physical layout for said circuit, said physical layout comprising a plurality of layout devices, each layout device being characterized by a unique layout device name;

causing said data processing system to generate a graphical representation of said circuit from said physical layout, said graphical representation having one layout device corresponding to each of said plurality of schematic devices, said schematic device for each schematic device matching said layout device name of a corresponding one of said layout devices;

causing said data processing system to generate a first netlist from said graphical representation of said circuit;

causing said data processing system to generate a second netlist generated from said schematic; and causing said data processing system to generate a report specifying any differences in said first netlist and second netlist, wherein each schematic device name matches said corresponding one of said layout device names prior to said data processing system generating said first and second netlists.

20. The computer readable medium of claim 19 wherein said schematic further comprises an extra schematic device that does not have a corresponding layout device and wherein said method further comprises causing said data processing system to remove that schematic device from said schematic before generating said second netlist.

* * * * *